United States Patent
Watson (10) Patent No.: US 8,400,035 B2
(45) Date of Patent: Mar. 19, 2013

(54) ROTOR BEARING ASSEMBLY

(75) Inventor: Arthur Watson, Sugar Land, TX (US)

(73) Assignee: Schlumberger Technology Corporation, Sugar Land, TX (US)

( * ) Notice: Subject to any disclaimer, the term of this patent is extended or adjusted under 35 U.S.C. 154(b) by 460 days.

(21) Appl. No.: 12/643,223

(22) Filed: Dec. 21, 2009

(65) Prior Publication Data

US 2010/0166578 A1 Jul. 1, 2010

Related U.S. Application Data

(60) Provisional application No. 61/140,939, filed on Dec. 27, 2008.

(51) Int. Cl.
*H02K 7/08* (2006.01)

(52) U.S. Cl. .......................................... 310/90

(58) Field of Classification Search ............... 310/87, 310/90, 91, 261.1; 384/91–100, 255, 275, 384/285, 420, 424, 427, 907.1; 417/423.12, 417/423.3

See application file for complete search history.

(56) References Cited

U.S. PATENT DOCUMENTS

| | | | |
|---|---|---|---|
| 3,591,818 A * | 7/1971 | Fulton | 310/104 |
| 3,726,572 A * | 4/1973 | Beardmore | 384/113 |
| 3,879,094 A * | 4/1975 | Tschirky et al. | 384/420 |
| 4,710,036 A * | 12/1987 | Geczy | 384/275 |
| 4,732,491 A * | 3/1988 | Geczy | 384/95 |
| 5,044,056 A * | 9/1991 | Sundstedt et al. | 492/3 |
| 5,659,214 A * | 8/1997 | Guardiani et al. | 310/87 |
| 5,722,812 A * | 3/1998 | Knox et al. | 415/199.1 |
| 5,795,075 A | 8/1998 | Watson | |
| 6,091,175 A | 7/2000 | Kinsinger | |
| 6,350,105 B1 * | 2/2002 | Kobayashi et al. | 417/44.1 |
| 6,424,066 B1 | 7/2002 | Watson et al. | |
| 6,702,554 B1 * | 3/2004 | Sørensen | 417/420 |

* cited by examiner

*Primary Examiner* — Tran Nguyen
(74) *Attorney, Agent, or Firm* — Jim Patterson

(57) ABSTRACT

An electrical submersible pump according to one or more aspects of the present invention comprises a stator; a rotatably shaft; and a rotor bearing disposed between the shaft and the stator, the rotor bearing comprising carbide bearing sleeve receiving the shaft, wherein the carbide bearing sleeve does not form a keyway; and a device rotatively coupling the carbide bearing sleeve to the shaft.

9 Claims, 6 Drawing Sheets

ROTOR BEARING ASSEMBLY

RELATED APPLICATIONS

This application claims the benefit of U.S. Provisional Patent Application No. 61/140,939 filed on Dec. 27, 2008.

SUMMARY

According to one or more aspects of the present invention, an electric motor comprises a housing; a stator mounted within the housing; a shaft rotatably mounted within the housing; and a rotor bearing comprising a carbide bearing sleeve attached to the shaft by a metal member.

According to one or more aspects of the present invention, a bearing apparatus for use with a rotating shaft comprises a carbide sleeve having an internal surface forming a bore for receiving the shaft; and a device to rotatively couple the carbide sleeve to the shaft.

An electrical submersible pump according to one or more aspects of the present invention comprises a stator; a rotatably shaft; and a rotor bearing disposed between the shaft and the stator, the rotor bearing comprising carbide bearing sleeve receiving the shaft, wherein the carbide bearing sleeve does not form a keyway; and a device rotatively coupling the carbide bearing sleeve to the shaft.

BACKGROUND

This section provides background information to facilitate a better understanding of the various aspects of the invention. It should be understood that the statements in this section of this document are to be read in this light, and not as admissions of prior art.

Submersible pumping systems have been employed in the pumping of oil and water from wells for many years. Commonly, a submersible pumping system comprises an electric motor, a motor protector and a pump suspended colinearly in a well by tubing or cable. The pump is generally a centrifugal pump which is coupled to the motor. The motor rotates a power transmission shaft that concurrently operates the pump. The motor and motor protector are filled with oil to aid in heat dissipation, to maintain proper internal lubrication of the motor, and to separate the internal components of the motor from surrounding wellbore fluids.

Because these pumping systems are generally disposed within a narrow well, the motor, motor protector, and pump are generally long and cylindrically shaped. The motors vary in horsepower depending on the application. Accordingly, the motors of submersible pumping systems can be quite long leading to particular difficulties not encountered in other electric motor applications.

The motors of submersible pumping systems typically comprise a stator secured within a tubular housing and a rotor secured to a power transmission shaft that rotates within the stator. The rotor typically is made up of a number of rotor sections, the number of rotor sections depending upon the length and power rating of the motor. Generally, each rotor section comprises laminated steel plates or disks secured by copper rods. The rotor sections are spaced apart from each other, and a rotor bearing assembly is located between each rotor section. Each rotor section is connected to the shaft so that all of the rotor sections rotate as the shaft rotates.

Each rotor bearing assembly within a rotor section acts to support the shaft and to maintain it in proper axial alignment. A rotor bearing assembly comprises a sleeve connected to the shaft so that the sleeve and shaft rotated together and a journal (e.g., bearing, bushing) disposed coaxially around the sleeve. The sleeve and journal are rotatively coupled to one another. The journal may be configured to frictionally engage the inner wall of the stator (e.g., housing) to prevent the journal from rotating and to maintain proper alignment of the shaft. Thus, a portion of the rotor bearing assembly is rigidly coupled to the shaft but not to the stator.

Due to the high operating temperatures within the well, thermal expansion tends to cause the shaft, rotor, and stator to grow axially. Generally, the rotor and shaft tend to grow axially downward during high temperature operation. The stator also tends to grow axially downward, however, to a lesser extent than the rotor and the shaft. Due to these thermal expansion effects, the motor is constructed so that each rotor bearing assembly attached to the motor shaft within a rotor section offers a limited amount of axial mobility. Thus, because each rotor bearing assembly is coupled to the motor shaft, the shaft retains the same limited amount of axial mobility. In some pumps, axial mobility is limited by thrust washers adjacent to each rotor bearing assembly.

Angular misalignment of the shaft within the motor can occur because the rotor, shaft, and stator are subject to these dimensional changes due to thermal expansion and because of imbalances in the rotating assembly. Misalignment of the shaft during operation opposes the centering, or aligning force of the bearing assembly and causes vibrations within the motor. Excess vibration can lead to premature motor or component failure.

Ideally, the journal remains stationary while the sleeve, rotor, and shaft are rotating. Rotor bearing assemblies have been used in which the peripheral surface of the journal frictionally engages the inner surface of the stator through metal-to-metal contact, such as via a metallic washer. Such metal-to-metal frictional fit rotor bearing assemblies have a tendency to become loose and then to rotate with the shaft. Rotation of the journal tends to gouge and deface the inner surface of the stator. Once the journal begins to rotate with the shaft, the centering force of the rotor bearing assembly is diminished leading to increasing angular misalignment, vibration, and motor failure. This type of construction is also unsatisfactory because due to thermal expansion of the bearing assembly during motor operation, the journal may tightly engage the stator wall which can cause angular misalignment of the shaft and thus excessive thrust loads onto the thrust bearing surfaces adjacent to the rotor bearing assembly.

Some electric submersible pumps utilize ceramic carbide (e.g., tungsten carbide, silicon carbide, aluminum nitrite, boron carbide, cobalt) bearings (e.g., sleeve and/or bushing) to resist the abrasive action of sand or other hard particles in the well fluid and to function with very low viscosity lubrication. A major challenge with ceramic carbide devices is securing the mating bearing components in a manner that does not create serious stress raisers that make the ceramic carbide susceptible to cracking. Cracking may be caused by shock loads encountered during shipping, handling or installation. Cracking may also be caused by thermal expansion stresses due to running in a poor lubricant that insufficiently lubricates or cools the bearing, such as low viscosity fluid or in a well fluid with a high gas content. Cracking may also be caused by axial or transverse shocks during operation, particularly as the pump shaft constantly moves upward and downward during gas slugging. A catastrophic pump failure may occur, if even one of the cracked bearings (e.g., sleeves) in the rotor (e.g., impeller) stack actually breaks apart.

BRIEF DESCRIPTION OF THE DRAWINGS

The invention is best understood from the following detailed description when read with the accompanying figures. It is emphasized that, in accordance with standard practice in the industry, various features are not drawn to scale. In fact, the dimensions of various features may be arbitrarily increased or reduced for clarity of discussion.

DETAILED DESCRIPTION

It is to be understood that the following disclosure provides many different embodiments, or examples, for implementing different features of various embodiments. Specific examples of components and arrangements are described below to simplify the disclosure. These are, of course, merely examples and are not intended to be limiting. In addition, the disclosure may repeat reference numerals and/or letters in the various examples. This repetition is for the purpose of simplicity and clarity and does not in itself dictate a relationship between the various embodiments and/or configurations discussed. Moreover, the formation of a first feature over or on a second feature in the description that follows may include embodiments in which the first and second features are formed in direct contact, and may also include embodiments in which additional features may be formed interposing the first and second features, such that the first and second features may not be in direct contact.

Aspects of the invention relate to rotor bearing assemblies which may be utilized for example in various types of pumps, compressors separators and the like. For purposes of clarity and brevity, aspects of the invention are described generally with reference to electric submersible pumps and wellbore operations. How to utilize aspects of the invention in devices (e.g., intakes, pumps, compressors, etc.) other than electric submersible pumps will be understood by those skilled in the art in view of this disclosure.

As used herein, the terms "up" and "down"; "upper" and "lower"; "top" and "bottom"; and other like terms indicating relative positions to a given point or element are utilized to more clearly describe some elements. Commonly, these terms relate to a reference point as the surface from which drilling operations are initiated as being the top point and the total depth of the well being the lowest point, wherein the well (e.g., wellbore, borehole) is vertical, horizontal or slanted relative to the surface.

Figure 1:
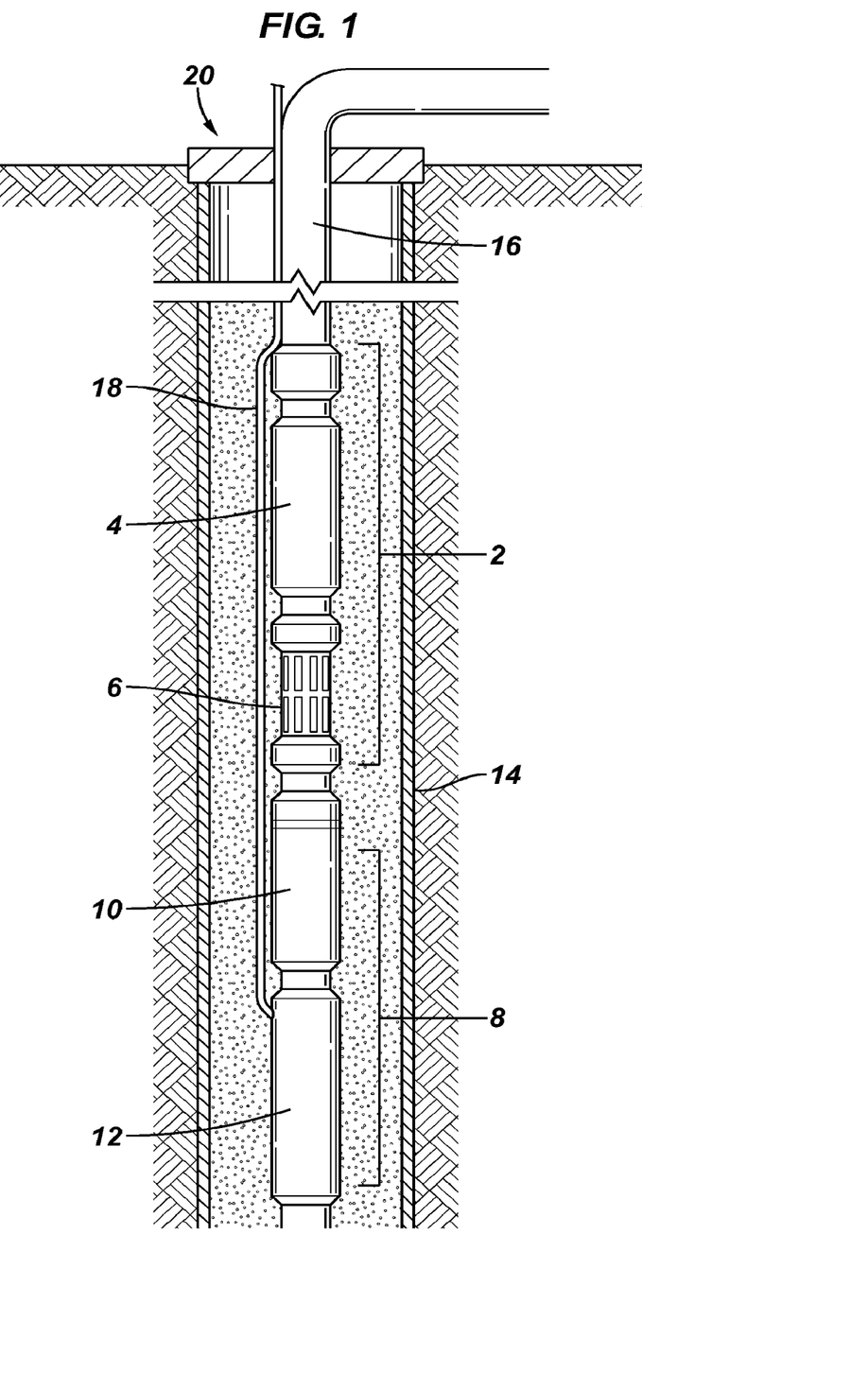
FIG. 1 is a schematic elevation view of an apparatus according to one or more aspects of the invention utilized in an electric submersible pump.

FIG. 1 is an elevation view of a submersible pumping system disposed in a well and depicted as including a pump module and a motor module. Pump module 2 comprises of a pump 4 and an inducer or intake section 6 for the pump. Motor module 8 comprises a motor protector 10 and a motor 12. The pump module and the motor module are coupled to one another and disposed colinearly within a well 14 and suspended at an appropriate position within well 14 by tubing 16. Electrical power is provided to the motor by means of a power cable 18. The fluid of interest (e.g., formation fluid, water, hydrocarbons, etc.) is pumped from the well by the submersible pumping system to the surface through tubing 16 and through well head 20.

Figure 2:
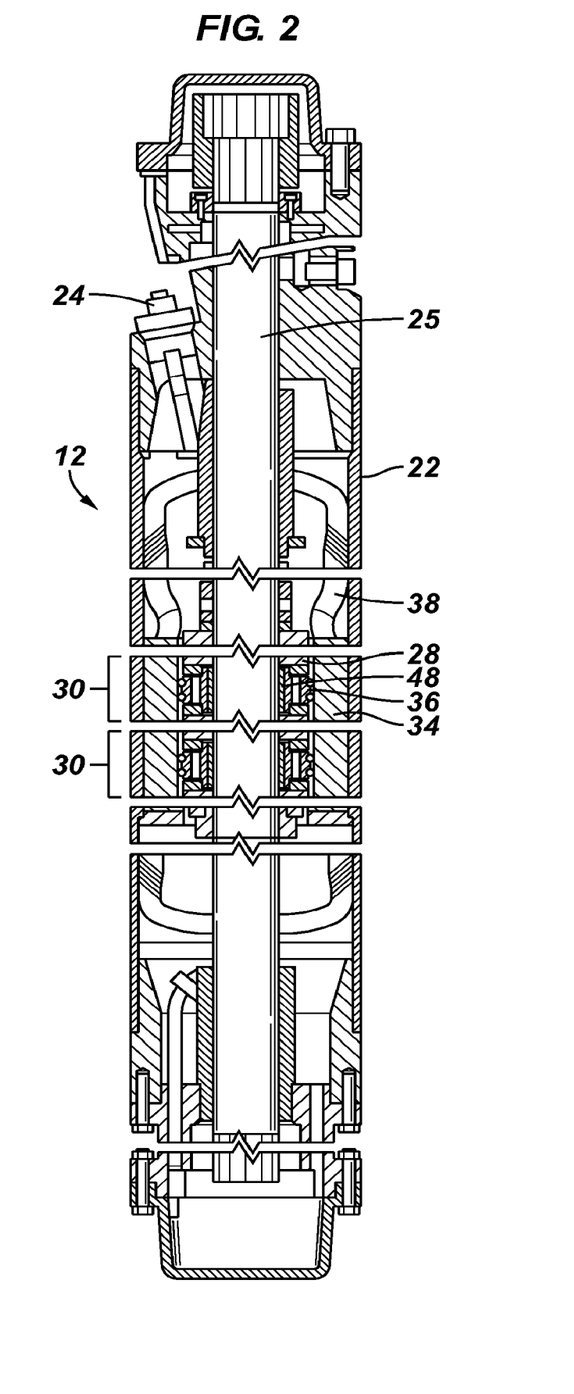
FIG. 2 is a cut-away view of a pump motor of an electrical submersible pump according to one or more aspects of the invention.

FIG. 2 illustrates a submersible pump motor 12 in accordance with one or more aspects of the invention. The motor is contained within a housing 22 into which an electrical connector 24 penetrates for transmitting power from cable 18 (See FIG. 1). The motor comprises a rotating group and a non-rotating group. The rotating group includes a power transmission shaft 26, a rotor section 28 and sleeve 48. The depicted system comprises multiple rotor sections 28 and sleeves 48. In the depicted embodiment, sleeve 48 is constructed in whole or in-part of a carbide (e.g., ceramic carbide), including without limitation, tungsten carbide, silicon carbide, aluminum nitrite, boron carbide, cobalt.

The non-rotating group includes a stator 34 and journal(s) 36. Depicted stator 34 is constructed of metal laminations. Stator 34 may be configured with slots running axially through the stator body through which windings 38 run. Each journal 36 is disposed circumferentially about a sleeve 48 and is positioned between stator 34 and the respective sleeve 48. According to one or more aspects of the invention, each rotor bearing assembly 30 comprises a sleeve 48 and journal 36. Rotor sections 28 lie immediately adjacent above and below each journal 36 in the embodiment depicted in FIG. 2.

Figure 3:
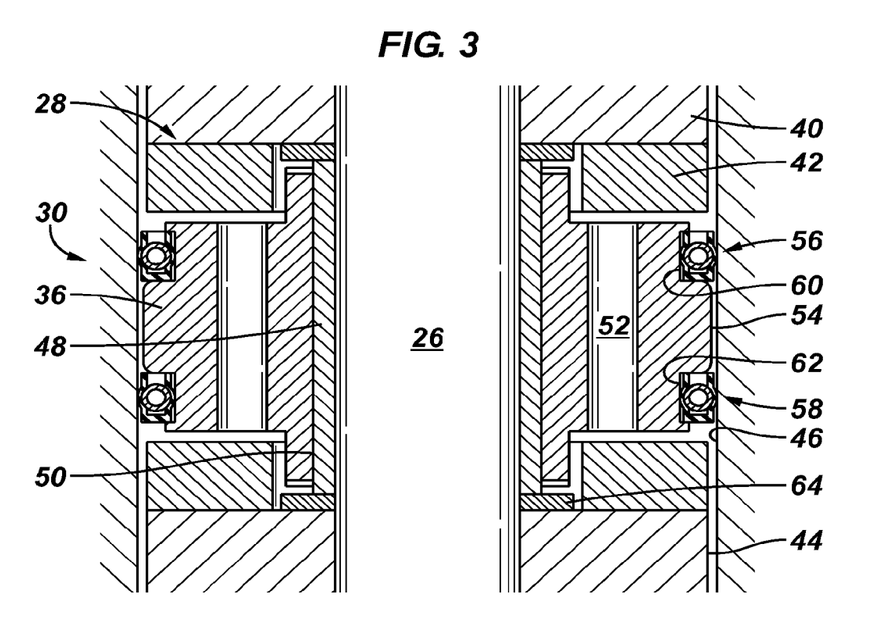
FIG. 3 is an enlarged view of a rotor bearing assembly according to one or more aspects of the invention.

FIG. 3 is an enlarged view of a portion of a rotor bearing assembly according to one or more aspects of the invention. Depicted in FIG. 3, each rotor section 28 includes a laminated rotor core 40 and a copper end ring 42. Each rotor section 28 has an outer wall 44 which is spaced apart from the inner wall 46 of stator 34. According to one or more aspects of the invention, sleeve 48 is constructed of a carbide and is rotatively coupled (e.g., attached) to power transmission shaft 26. According to one or more aspects of the invention, the bearing assembly comprises one or more features to reduce and/or limit the stress raiser on one or more ceramic carbide features of the bearing assembly. For example, according to one or more aspects of the invention elements may be utilized to limit the torque applied to sleeve 48 and/or to limit the axial or radial load on sleeve 48 relative to a sleeve that does not utilize the features. According to one or more aspects of the present invention, the devices rotatively coupling sleeve 48 to shaft 26 facilitate providing a carbide cylindrical without a carbide torque-transmitting feature such as a keyway or the like formed in the carbide surface of sleeve 48.

Rotor sections 28, while rotatively coupled to shaft 26, are not individually axially coupled to shaft 26. The lower most rotor section at the end of shaft 26 is, however, axially locked to the shaft in order to support the other rotor sections. Sleeves 48, while rotatively coupled to shaft 26 are likewise not axially locked to shaft 26. Thus, the rotor sections 28 and the sleeves 48 have a certain amount of freedom to move in an axial direction, i.e., either upward or downward due to relative thermal expansion and contraction. In the embodiment depicted in FIG. 3, an upper edge or circular rim of sleeve 48, or a load carrying portion of sleeve 48, contacts an upper thrust washer 64 which is immediately adjacent to the lowermost lamination of upper rotor section 28. The lower edge of sleeve 48 contacts a lower thrust washer 64 which is immediately adjacent to the uppermost lamination of the lower rotor section 28. The thrust washers 64 are constructed of a phenolic laminate. Thus, each sleeve 48 supports the weight of the rotor section 28 immediately above it and transmits any force from that rotor section to the rotor section 28 immediately below. As will be understood by those skilled in the art with reference to the various Figures, sleeve 48 may comprise one or more features to limit the load that is applied to a ceramic carbide portion of sleeve 48.

The non-rotating group includes stator 34 and journals 36. Each journal 36 is disposed circumferentially about a sleeve 48. Thus, where sleeve 48 and journal 36 abut one another is a rotating interface 50. Multiple axially disposed cylindrical passageways 52 through journal 36 provide for oil flow through journal 36 in order that the oil filling the motor can communicate with adjacent rotor sections for cooling and lubrication.

Journal 36 extends radially outward from sleeve 48 to a peripheral surface 54. Peripheral surface 54 is slightly spaced apart from the inner surface 46 of stator 34 in the depicted embodiment. Clearance between these components is commonly about 0.005" to about 0.009". Thus, there is no material-to-material contact between journal 36 and stator 34 in the embodiment of FIG. 3. However, according to one or more aspects of the invention as described with reference to the figures that follow, journal 36 may be attached (e.g., coupled) to stator 34 (e.g., a housing) for example by a key extending between peripheral surface 54 and inner surface 46.

In the embodiment of FIG. 3, the outer peripheral surface of journal 36 presents a pair of annular support regions 60 and 62. Seals 56 and 58 are positioned within circumferential support regions 60 and 62 and frictionally engage inner surface 46 of stator 34. Circumferential support regions 60 and 62 are preferably spaced apart from one another. In the depicted embodiment a circumferential support region 60 is disposed adjacent the upper surface of journal 36 and region 62 is disposed adjacent the lower surface. This spacing of the circumferential support regions, and thus the seals, may provide improved resistance to angular misalignment of the shaft.

Figure 4:
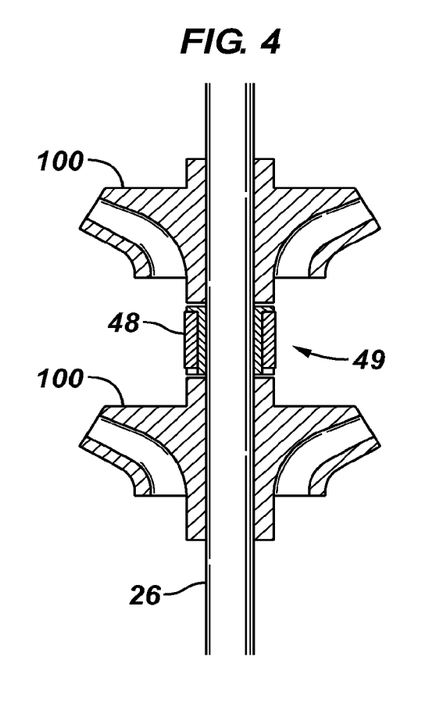
FIG. 4 is schematic illustration of a bearing sleeve according to one or more aspects of the invention disposed on a shaft between impellers.

FIG. 4 is schematic illustration of a bearing sleeve according to one or more aspects of the invention disposed between impellers. Features of the bearing assembly (e.g., housing, journal) are removed in FIG. 4 to depict the sleeve assembly. In a compression pump, for example, thrust load generated by impellers 100 is transmitted through the stack of impellers 100 and bearing sleeves 48 to the thrust bearing in the protector (e.g., motor protector 10 of FIG. 1). When a sleeve 48 breaks up, the impeller thrust is transferred to the adjacent diffusers which can cause rapid wear in the abrasive environment of a wellbore for example. According to one or more aspects of the invention, sleeve 48 (e.g., sleeve assembly 49) may comprise a feature to transfer the axial thrust load across the ceramic carbide portion of the sleeve thereby, in effect, removing the ceramic carbide sleeve 48 member from the stack for purposes of the axial thrust load.

Members and/or features of the invention may be utilized in rotor bearing assemblies such as the rotor bearing depicted in FIG. 3 (e.g., rotor bearing assembly 30 of FIG. 2) as well as other current and prior rotor bearing assemblies. Examples of rotor bearing assemblies utilized in electric submersible pump systems include those disclosed in U.S. Pat. Nos. 5,795,075, 6,091,175 and 6,424,066 all of which are incorporated herein by reference.

Figure 5A:
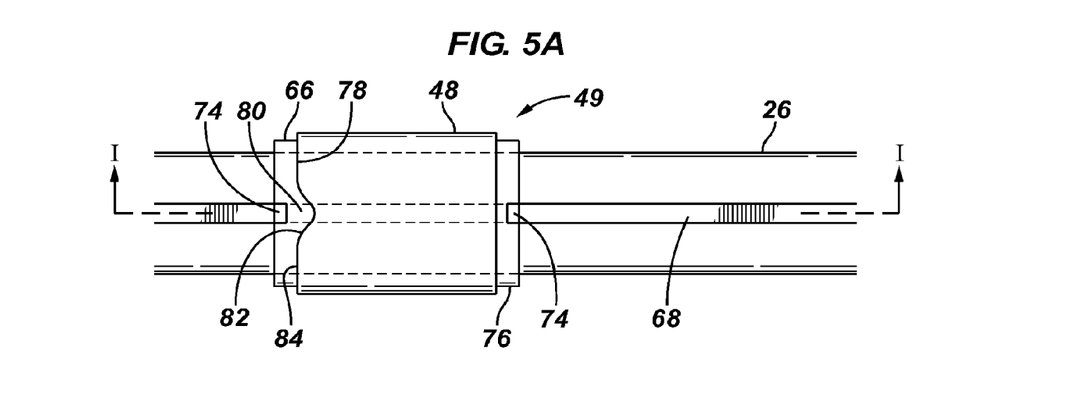
FIG. 5A is a schematic illustration of a bearing sleeve assembly according to one or more aspects of the invention attached to a shaft.
Figure 5B:
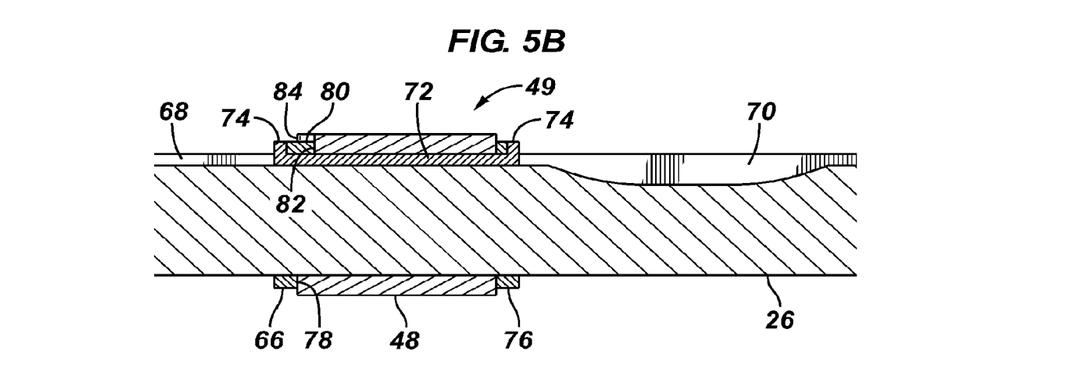
FIG. 5B is section view along the line I-I of FIG. 5A.

Refer now to FIGS. 5A and 5B which illustrates an embodiment of rotor bearing according to one or more aspects of the invention. FIGS. 4A and 4B depict a keyless rotor bearing sleeve 48 (e.g., sleeve 48 does not have a keyway) which is driven by a drive ring 66. In this embodiment, sleeve 48 is a silicon carbide member. Shaft 26 comprises a keyway 68 extending axially along shaft 26. A depression 70 (e.g., dip) may be provided along a portion of keyway 68 for example to attach the assembly to shaft 26 for example when keyway 68 does not extend the full length and or to a terminal end of shaft 26. Depression 70 may be described is a reduced diameter portion relative to the outside diameter of shaft 26 and keyway 68.

In this embodiment, sleeve assembly 49 assembly includes sleeve 48 member, a key 72 have opposing tabs 74 (e.g., ears), and a drive ring 66. Sleeve assembly 49 may further comprise a reaction ring 76. Drive ring 66 comprises a face 78 having a protrusion 80. Protrusion 80 may be formed in various manners, such as and without limitation as a tab, peg, arm or other portion. In the depicted embodiment, face 78 is a contoured surface (e.g., sinusoidal) which forms protrusion 80. Protrusion 80 is adapted to mate with notch 82 formed along the shoulder 84 of sleeve 48.

The contact between protrusion 80 of drive ring 66 and shoulder 84, for example at notch 82, of sleeve 48 generates a small axial force that tends to separate the members. Key 72 couples drive ring 66 and sleeve 48 and tends to maintain face 78 and shoulder 84 in contact countering the separation that may occur for example because of the slack that is provided to address thermal expansion in the rotor and bearing stack. Reaction ring 76 may be disposed along the opposing shoulder (e.g., end) of sleeve 48 from drive ring 66. Reaction ring 76 and drive ring 66 are coupled to sleeve 48 via key 72 and opposing key tabs 74. Sleeve assembly 49 provides a mechanism for rotationally locking (e.g., attaching, coupling) sleeve 48 with shaft 26, so that they rotate together, and allow for axial movement relative to shaft 26 for example to address thermal expansion. Key 72 and drive ring 66 provide a locking mechanism that eliminates a need to cut a keyway in sleeve 48 that creates an undesired stress raiser. Further, the utilization of key 72, drive ring 66 and optional retainer ring 76 may reduce the axial load that is applied to sleeve 48, for example by the rotor sections and/or impellers. The locking features, for example key 72, drive ring 66 and retainer ring 76 may be constructed of various materials such as metal and steel.

Figure 6A:
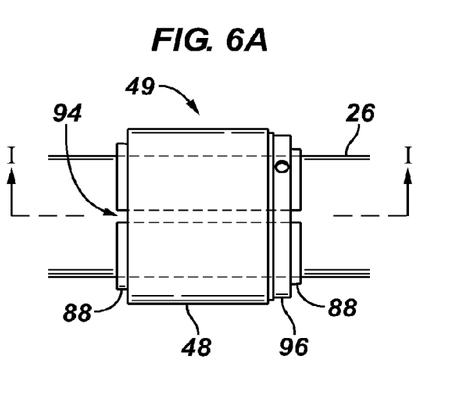
FIG. 6A is a schematic illustration of another bearing sleeve assembly according to one or more aspects of the invention attached to a shaft.
Figure 6B:
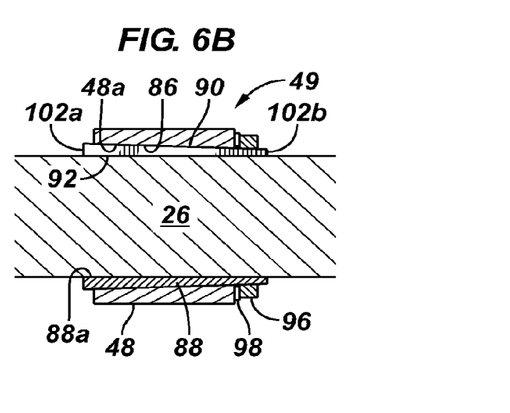
FIG. 6B is section view along the line I-I of FIG. 5A.

FIGS. 6A and 6B depict another embodiment of a sleeve assembly according to one or more aspects of the invention. This embodiment depicts a means of coupling or locking one or more components of a rotor bearing assembly with another member. For example, FIGS. 5A, 5B depict sleeve 48 rotationally locked relative to shaft 26 without utilizing a keyway or pressed ring.

Sleeve 48 is constructed of a carbide material, such as silicon carbide. Sleeve 48 comprises an internal bore 48a defined by a tapered internal surface 86. A cylindrical member 88 (e.g., collet, bushing) having an outer surface 90 and an inner surface 92 forming a bore 88a is disposed between sleeve 48 and shaft 26. Member 88 is a metal member in this embodiment. Outer surface 90 is tapered surface, tapering down in thickness from one end 102a of member 88 to the other end 102b. Tapered outer surface 90 corresponds with internal tapered surface 86 of sleeve 48. Member 88 forms an axial (e.g., longitudinal) slit 94 which extends radially through member 88 from the inner surface 92 to outer surface 90 and may extend partially or entirely along the axial length of member 88. One or more slits 94 may be formed. For example, instead of forming a slit 94 extending the axial length of member 88 it may be desired to utilize one or more slits 94 that extend less than the full axial length of member 88. Slit(s) 94 permit member 88 to forcefully expand and/or contract in diameter and to provide a friction lock around shaft 26. According to one or more aspects of the invention sleeve assembly 49, comprising carbide sleeve 48 and member 88, may reduce the forces (e.g., loads) applied to the carbide sleeve 48. Ceramic carbide sleeve 48 is not required to deflect and does not have any stress raising notches, keyways and the like.

In the depicted sleeve assembly 49, member 88 receives shaft 26 in bore 88a and carbide bearing sleeve 48 is receives member 88 in bore 48a (e.g., coaxially aligned with member 88). The opposing ends 102a, 102b of inner member 88 extend beyond the axial opposing ends of carbide bearing sleeve 48. In this embodiment, a member 96 (e.g., collar) is attached to member 88 (e.g., at end 102b), for example via threading, adjacent to an end of sleeve 48 (e.g., the bottom end). A hole 98a is depicted for connecting a spanner wrench to threadedly couple collar 96 to member 88. A biasing member 98 is depicted disposed between collar 96 and sleeve 48. Biasing member 98 (e.g., leaf spring, Belleville spring, wave spring, etc.) maintains the fit of sleeve 48 with member 88 across a range of thermal contraction and expansion of the members relative to one another. According to one or more aspects of the invention, sleeve assembly 49, comprising member 88 (e.g., metal), carbide sleeve 48 and one or more of collar 96 and biasing member 98 may reduce the axial force applied to carbide sleeve 48.

Figure 7A:
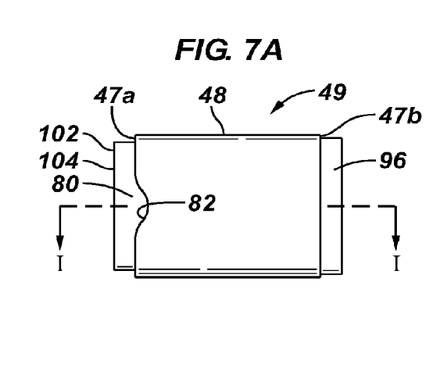
FIG. 7A is a schematic illustration of a bearing sleeve assembly according to one or more aspects of the invention.
Figure 7B:
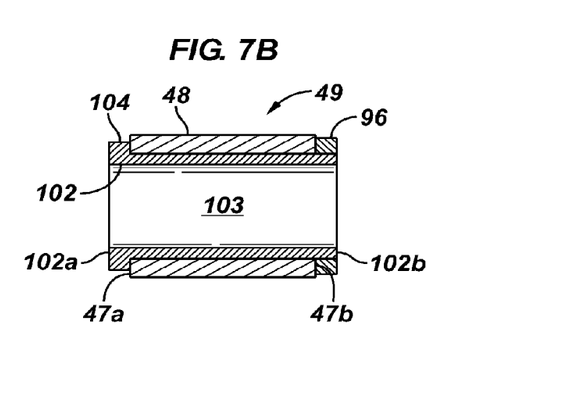
FIG. 7B is a sectional view of the bearing sleeve assembly along the line I-I of FIG. 7A.

FIGS. 7A and 7B are schematic illustrations of another embodiment of a rotor bearing sleeve assembly according to one or more aspects of the invention. Bearing sleeve assembly 49 comprises an inner cylindrical member 102 (e.g., liner, sleeve, collar, etc.) having an internal bore 103 adapted for disposing the shaft and sleeve member 48 coaxially disposed over at least a portion of inner member 102. In the depicted embodiment, sleeve 48 is constructed of a ceramic carbide and inner member 102 is metal. Inner member 102 comprises a terminal lip 104 extending radially away from bore 103. Terminal lip 102 may have a face (e.g., contoured) providing a protrusion 80 adapted to mate with a notch 82 formed on sleeve member 48 which may prevent rotation of sleeve 48 and inner member 102 relative to one another. In the depicted embodiment a member 96 (e.g., collar, collet) is coupled to end 102a (e.g., by threading) of inner member 102 distal from end 102a and terminal lip 104. Thus, inner member 102, which is metal in this embodiment, extends beyond the ends 47a, 47b of outer sleeve 48 providing a means for transferring an axial load across ceramic carbide sleeve 48 instead of the axial load acting on carbide sleeve 48, for example as depicted in the embodiment of FIG. 4. Assembly 49 depicted in FIGS. 7A and 7B may include one or more features to facility attaching sleeve assembly to a shaft for example. Some examples of linking or attaching features include, without limitation, keys, keyways, hooks, threads, assemblies such as depicted in FIGS. 5A-5B and 6A-6B.

Figure 8A:
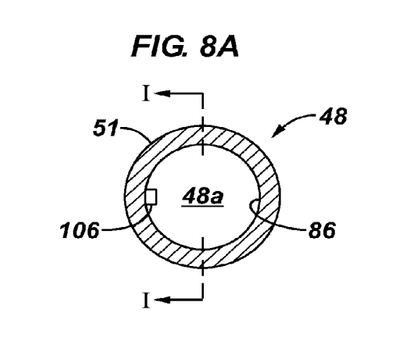
FIG. 8A is a schematic, end view of a bearing sleeve according to one or more aspects of the invention.
Figure 8B:
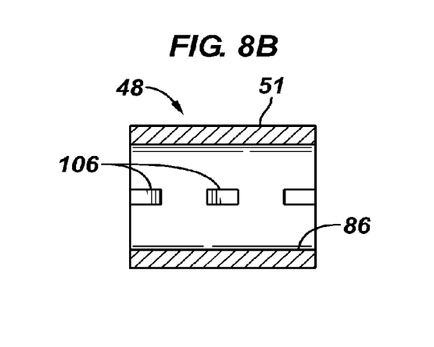
FIG. 8B is a sectional view of the bearing sleeve along the line I-I of FIG. 8A.

FIGS. 8A and 8B are schematic illustrations of a ceramic carbide bearing sleeve 48 according to one or more aspects of the invention. Sleeve 48 comprises an internal surface 86 defining bore 48a and an outer surface 51 which may provide rotating interface 50 with journal 36 as depicted for example in FIG. 3. In this embodiment, a metal key 106 is provided at internal surface 86 to rotationally lock sleeve 48 to shaft 26 and key 68 (See FIGS. 5A, 5B). In the depicted embodiment, key(s) 106 are attached to inner surface 86 by a metallurgical bond (e.g., solder, brazing, silver soldering, welding, and sintering).

Cutting a keyway into the inside diameter of sleeve 48 to engage a loose key, which may engage a shaft keyway, creates as stress raiser. In the depicted embodiment, one or more attachment (e.g., linking, fastening) features 106, which are depicted as keys in FIGS. 7A-7B, are attached to the inside diameter of sleeve 48 by a metallurgical bond. The metallurgical bond (e.g., soldering, brazing) forms a joint that is sufficiently strong for the light torque that the key must transmit from the shaft to sleeve 48. To address the differential thermal expansion of metal key 106 over the axial length of sleeve 48, key 106 may be constructed in relatively short sections. If greater shear strength and/or greater key engagement are needed, a plurality of keys 106 may be attached to sleeve 48 to increase the shear strength and provide a greater contact between the shaft and sleeve. Metallurgical bonding of metal key(s) 106 to ceramic carbide sleeve 48 introduces a lower stress raiser than a keyway formed in sleeve 48 or a notch formed at an end face of sleeve 48 because it does not create an interruption in the continuous cylindrical surface of sleeve 48. Additionally, this configuration may provide a shorter sleeve assembly and/or rotor bearing assembly than a traditional bearing assembly.

Figure 9A:
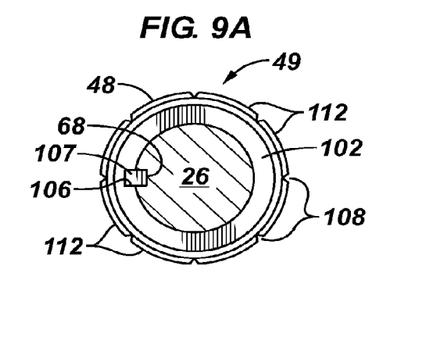
FIG. 9A is a schematic end view of a bearing sleeve assembly according to one or more aspects of the invention.
Figure 9B:
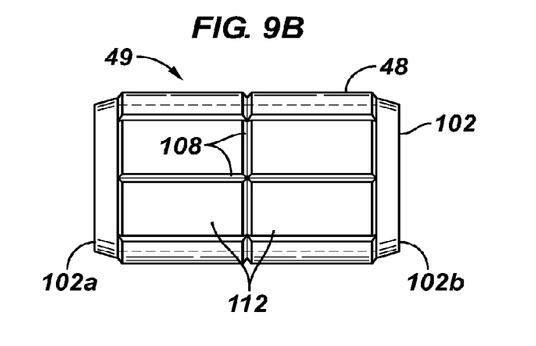
FIG. 9B is a schematic view of the bearing sleeve assembly of FIG. 7A.

FIGS. 9A and 9B are schematic illustrations of another embodiment of a sleeve according to one or more aspects of the invention. In the depicted embodiment, sleeve assembly 49 comprises a ceramic carbide sleeve 48 coaxially receiving or carried by an inner member 102 (e.g., liner, sleeve) constructed for example of metal. Ceramic carbide sleeve 48 and metal inner member 102 may be coupled by metallurgical bonding. Internal member 102 provides an attachment feature 106 for attaching sleeve assembly 49 for example to a shaft 26 (e.g., FIGS. 3, 4, 5A, 5B) for transmission of torque. In the depicted embodiment, attachment feature 106 is a keyway for engaging a key 107 which is coupled to shaft 26. Depicted key 107 is a loose key disposed in keyway 106 of sleeve assembly 49 and keyway 68 of shaft 26. Other examples of attachment features 106 include, without limitation, a keys, lugs, holes, threads, and hooks. For example, attachment feature 106 may be a metal key attached to inner member 102 or formed by inner member 102. In the depicted embodiment of FIGS. 9A-9B, ends 102a, 102b of inner member 102 extend beyond the ends of sleeve 48 for example to transmit axial loads around sleeve 48.

The depicted embodiment further depicts grooves 108. Scoring ceramic carbide sleeve 48 for example to form grooves 108 may promote controlled cracking of sleeve 48. In another embodiment, described with reference to FIGS. 9A-9B, sleeve 48 comprises a plurality of ceramic carbide tiles 112 attached to inner member 102 for example by metallurgical bonding or non-metallurgical connections. The plurality of tiles 112 may alleviate cracking and breaking up compared to a monolithic ceramic carbide component due to thermal expansion and contraction or deflection under load.

Figure 10:
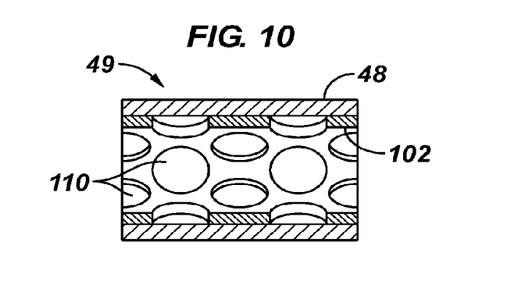
FIG. 10 is sectional view of a bearing sleeve according to one or more aspects of the invention.

The inner metal member may comprise strain relief features to alleviate problems, due to differential thermal expansion for example, by allowing the metal member 102 to yield in one direction while retaining its strength in another direction. For example, a metal sleeve or liner may include axial slits 94 (e.g., slots) as depicted in FIGS. 6A-6B. Referring to FIG. 10, relief features 110 are depicted formed through inner metal member 102. In the embodiment depicted in FIG. 10, relief features 110 are not formed through ceramic carbide sleeve 48.

Metal alloys that are commonly used in electric submersible pumps have a coefficient of thermal expansion ("CTE") significantly higher than that of ceramic carbide materials used in bearing components. The CTE (microinches/in/F) of tungsten carbide is 3.9, while alloy steels range from about 6.3 to 8.3 (e.g., Monel is 7.8 and Inconel is 6.4). This differential CTE can lead to cracking or spalling of the carbide. To alleviate such problems, the metal components can be made, for example, of iron-nickel or iron-nickel-cobalt alloys having CTE's more closely matching the CTE of the ceramic carbide members.

The foregoing outlines features of several embodiments so that those skilled in the art may better understand the aspects of the invention. The features and/or aspects of the depicted embodiments are provided for purposes of illustration and description, therefore it will be recognized by those skilled in the art that various features and aspects of the depicted embodiments may be combined with one another in manners not illustrated. Those skilled in the art will appreciate that they may readily use the disclosure as a basis for designing or modifying other processes and structures for carrying out the same purposes and/or achieving the same advantages of the embodiments introduced herein. Those skilled in the art will also realize that such equivalent constructions do not depart from the spirit and scope of the invention, and that they may make various changes, substitutions and alterations herein without departing from the spirit and scope of the invention. The scope of the invention should be determined only by the language of the claims that follow. The term "comprising" within the claims is intended to mean "including at least" such that the recited listing of elements in a claim are an open group. The terms "a," "an" and other singular terms are intended to include the plural forms thereof unless specifically excluded.

What is claimed is:

1. An electric motor, comprising:
    a housing;
    a stator mounted within the housing;
    a shaft rotatably mounted within the housing; and
    a rotor bearing comprising a carbide bearing sleeve without a keyway, the carbide bearing sleeve being attached to the shaft by a metal member, wherein the metal member is affixed to the carbide bearing sleeve and extends inwardly into a keyway of the shaft.

2. The electric motor of claim 1, wherein the metal member is attached to the carbide bearing sleeve by metallurgical bonding.

3. An electric motor, comprising:
    a housing;
    a stator mounted within the housing;
    a shaft rotatably mounted within the housing; and
    a rotor bearing comprising a carbide bearing sleeve attached to the shaft by a metal member, wherein the metal member comprises a key metallurgically bonded to an interior surface of the carbide bearing sleeve.

4. The electric motor of claim 3, wherein the carbide bearing sleeve is coaxially disposed over the metal member and the metal member extends beyond the axial ends of the carbide bearing sleeve.

5. An electric motor, comprising:
    a housing;
    a stator mounted within the housing;
    a shaft rotatably mounted within the housing;
    a rotor bearing comprising a carbide bearing sleeve attached to the shaft by a metal member, wherein the metal member comprises a cylindrical member disposed between the shaft and the carbide bearing sleeve, wherein the metal member is metallurgically bonded to the carbide bearing sleeve; and
    an attachment feature disposed on an interior surface of the metal member.

6. The electric motor of claim 5, wherein the attachment feature is selected from the group of a key and a keyway.

7. An electric motor, comprising:
    a housing;
    a stator mounted within the housing;
    a shaft rotatably mounted within the housing; and
    a rotor bearing comprising a carbide bearing sleeve attached to the shaft by a metal member, wherein the metal member comprises a cylindrical member having a strain relief feature formed in the cylindrical member, the cylindrical member coaxially received by the carbide bearing sleeve.

8. The electric motor of claim 7, wherein the cylindrical member comprises:
    an inner surface defining a bore receiving the shaft; and
    a tapered outer surface, the member decreasing in thickness from a first end to a second end.

9. The electric motor of claim 7, wherein the carbide bearing sleeve is coaxially disposed over the metal member and the metal member extends beyond the axial ends of the carbide bearing sleeve.

* * * * *